(12) United States Patent
Kalhan et al.

(10) Patent No.: US 7,664,198 B2
(45) Date of Patent: Feb. 16, 2010

(54) SYSTEM AND METHOD FOR BROADCASTING DATA OVER A WIRELESS NETWORK USING RATELESS CODES

(75) Inventors: Amit Kalhan, La Jolla, CA (US); Julien Nicolas, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 602 days.

(21) Appl. No.: 11/386,533

(22) Filed: Mar. 21, 2006

(65) Prior Publication Data

US 2007/0223620 A1    Sep. 27, 2007

(51) Int. Cl.
    *H04L 27/00* (2006.01)
(52) U.S. Cl. .......................... 375/295; 714/748; 714/749
(58) Field of Classification Search ................. 375/295; 714/748, 749
    See application file for complete search history.

(56) References Cited

U.S. PATENT DOCUMENTS

| | | | |
|---|---|---|---|
| 5,036,518 A | 7/1991 | Tseung | |
| 5,727,002 A | 3/1998 | Miller | |
| 6,542,718 B1 | 4/2003 | Kuo et al. | |
| 6,643,322 B1 | 11/2003 | Varma et al. | |
| 7,599,294 B2 * | 10/2009 | Walsh et al. | 370/235 |
| 2003/0005382 A1 | 1/2003 | Chen et al. | |
| 2003/0067872 A1 * | 4/2003 | Harrell et al. | 370/229 |
| 2003/0214966 A1 * | 11/2003 | Taylor | 370/432 |
| 2005/0010847 A1 * | 1/2005 | Shokrollahi et al. | 714/752 |
| 2005/0032522 A1 | 2/2005 | Soong et al. | |
| 2005/0138671 A1 * | 6/2005 | Love et al. | 725/123 |
| 2005/0251722 A1 | 11/2005 | Terry et al. | |
| 2006/0159050 A1 * | 7/2006 | Kim et al. | 370/331 |
| 2007/0101012 A1 * | 5/2007 | Li et al. | 709/231 |
| 2007/0133484 A1 * | 6/2007 | Albal et al. | 370/338 |
| 2007/0217432 A1 * | 9/2007 | Molisch et al. | 370/400 |
| 2009/0028258 A1 * | 1/2009 | Ma et al. | 375/260 |

OTHER PUBLICATIONS

Castura, "Rateless coding over fading channels," IEEE Communications Letters, vol. 10, pp: 46-48, 2006.*
Jenkac, "Asynchronous media streaming over wireless broadcast channels," in IEEE International Conference Multimedia and Expo 2005, pp: 1318-1321, 2005.*
Kumar, "Fountain broadcast for wireless networks", Technical report, CERCS, Georgia Tech, 2005.*

* cited by examiner

*Primary Examiner*—Juan A Torres (57) ABSTRACT

A system and method for broadcasting content data to a plurality of mobile devices. The content data is arranged into data blocks, and each data block is broadcast using an initial set of rateless transmission symbols. Mobile devices that did not receive a sufficient number of initial symbols respond with a no acknowledgment ("NACK") message, and a NACK rate for the broadcast system is monitored. Responsive to the NACK rate, additional symbols may be broadcast or otherwise transmitted to mobile devices, and, the NACK rate is used to determine when to terminate transmission of additional symbols for a particular data block. An initial set of symbols for the next data block may be transmitted concurrently with the additional symbols for one or more previous data blocks. The NACK rate may also be used as feedback to the broadcast system to adjust the transmission scheme.

23 Claims, 5 Drawing Sheets

SYSTEM AND METHOD FOR BROADCASTING DATA OVER A WIRELESS NETWORK USING RATELESS CODES

FIELD OF THE INVENTION

The present invention relates generally to wireless communication systems, and more specifically to broadcasting content material or data to mobile wireless devices.

BACKGROUND OF THE INVENTION

Consumers and users of mobile wireless devices are increasingly demanding and using broadband data services. For example, mobile wireless devices are often designed and configured to receive video, audio, and multimedia content, and are typically equipped with high quality video and audio output devices. In one example of a broadband application, many mobile wireless devices are arranged to receive the same live video and audio signal. In this way, the video and audio signal is "broadcast" to many mobile users, and each of the mobile devices receives and presents the video and audio to its respective user.

The use of a broadcast process enables a more efficient use of the network's forward communication link, that is, the communication link from the base station to the mobile devices. Since communication bandwidth is a limited resource, the broadcast model is particularly desirable. Because transmission quality is constantly changing in a wireless network, it is likely that at least some of the mobile stations in a coverage area will fail to receive some of the broadcast packets. Accordingly, the typical broadcast transmission system queries its mobile stations to determine channel quality for the worst user in the broadcast reception area, and the broadcast transmission scheme is then set according to the worst user's channel conditions. By determining and presetting the transmission scheme to the worst expected conditions, the broadcast is likely to be received by at least most of the intended mobile units. Unfortunately, because the selected modulation, power, and coding is set for the worst user, the overall efficiency and capacity for the network is reduced. Since transmission conditions change over time, a predetermined transmission scheme is unable to appropriately adapt to changing broadcast needs.

To provide adaptability, the network may require that mobile units provide an acknowledgment that broadcast packets have been successfully received. In this arrangement, the network sends data packets to each mobile unit, and the mobile unit responds to the network with an acknowledgment ("ACK") response. By acknowledging receipt of the data packets, the network can be assured that mobile stations are properly receiving data. For those mobile stations that do not respond with an ACK, the network resends the "lost" data packets until the mobile can acknowledge receipt. Unfortunately, the mobile devices send their respective ACK responses on the reverse link, that is, the communication link from the mobile device to the network. Typically, the reverse link has much less robustness compared to the forward link, and therefore is subject to overloading or other detrimental effects due to the transmission of many ACK signals from the mobile devices. In some cases, a network operating in a broadcast mode may be sending the same data packets to hundreds of mobile devices, and all the mobile devices may be attempting to send an ACK at about the same time. Since the reverse link may overload, or least cause a delayed response, the network may assume that many of the mobile devices failed to receive the broadcast, and begin resending data packets to many of the mobile devices unnecessarily, thereby causing stress and/or overload to the network, and degrading the quality of broadcast service. In some cases, such conditions may even cause failure of the network system.

As an alternative to waiting for an ACK response, a network may be configure to count a no-acknowledgment ("NACK") response that indicates that a mobile station did not successfully receive a complete set of data packets. In this way, a mobile device may begin receiving a set of data packets, and if all packets are received, not send any ACK or NACK response. However, if not all the packets are received, then the mobile device requests that the packets be resent by transmitting a NACK message to the network. The network, upon receiving the NACK, may resend the data packets to the mobile device. Although this arrangement causes less congestion on the reverse link, substantial "resend" traffic is generated on the forward link. In one particular problem, there may be some mobile devices on the fringe of the network, or positioned for poor transmission quality, which cause a continual resending of data packets. In this way, the network continues to use the forward link to send large amounts of data to the "fringe" mobile devices, with only a limited chance that these "fringe" devices will actually receive and decode the received data in a timely manner. In a similar manner, these same "fringe" devices continually generate and send NACK messages on the reverse link, which, due to the unreliable communication link, may or may not be received by the network system. In this way, the network expends an undue bandwidth on a few devices, and these devices have little chance of successfully presenting the broadcast data.

Because of the undesirable effects for providing broadcast feedback, most broadcast systems currently preset a "worst case" transmission scheme, and blindly use that scheme to broadcast content data to its remote devices. Accordingly, there exists a need for a more efficient and effective system and method to broadcast data to remote devices on a wireless network.

SUMMARY OF THE INVENTION

Briefly, a system and method is provided for broadcasting content data to a number of mobile devices. This content data may be video, image, or audio data, for example. The content data is arranged into data blocks, and each data block is broadcast using an initial set of rateless transmission symbols. Mobile devices that did not receive a sufficient number of initial symbols respond with a NACK message, and a NACK rate for the broadcast system is monitored. Responsive to the NACK rate, additional symbols may be broadcast or otherwise transmitted to mobile devices, and, the NACK rate is used to determine when to terminate transmission of additional symbols for a particular data block. An initial set of symbols for the next data block may be transmitted concurrently with the additional symbols for one or more previous data blocks. The NACK rate may also be used as feedback to the broadcast system to adjust the transmission scheme.

Advantageously, the broadcast system is able to more efficiently broadcast content data to a large number of mobile devices, while conserving scare reverse-link resources. The system may also provide useful statistical information indicative of forward channel quality, which may be applied to adjust transmission scheme settings.

These and other features of the present invention will become apparent from a reading of the following description,

DETAILED DESCRIPTION

Detailed descriptions of examples of the invention are provided herein. It is to be understood, however, that the present invention may be exemplified in various forms. Therefore, the specific details disclosed herein are not to be interpreted as limiting, but rather as a representative basis for teaching one skilled in the art how to employ the present invention in virtually any detailed system, structure, or manner.

Figure 1:
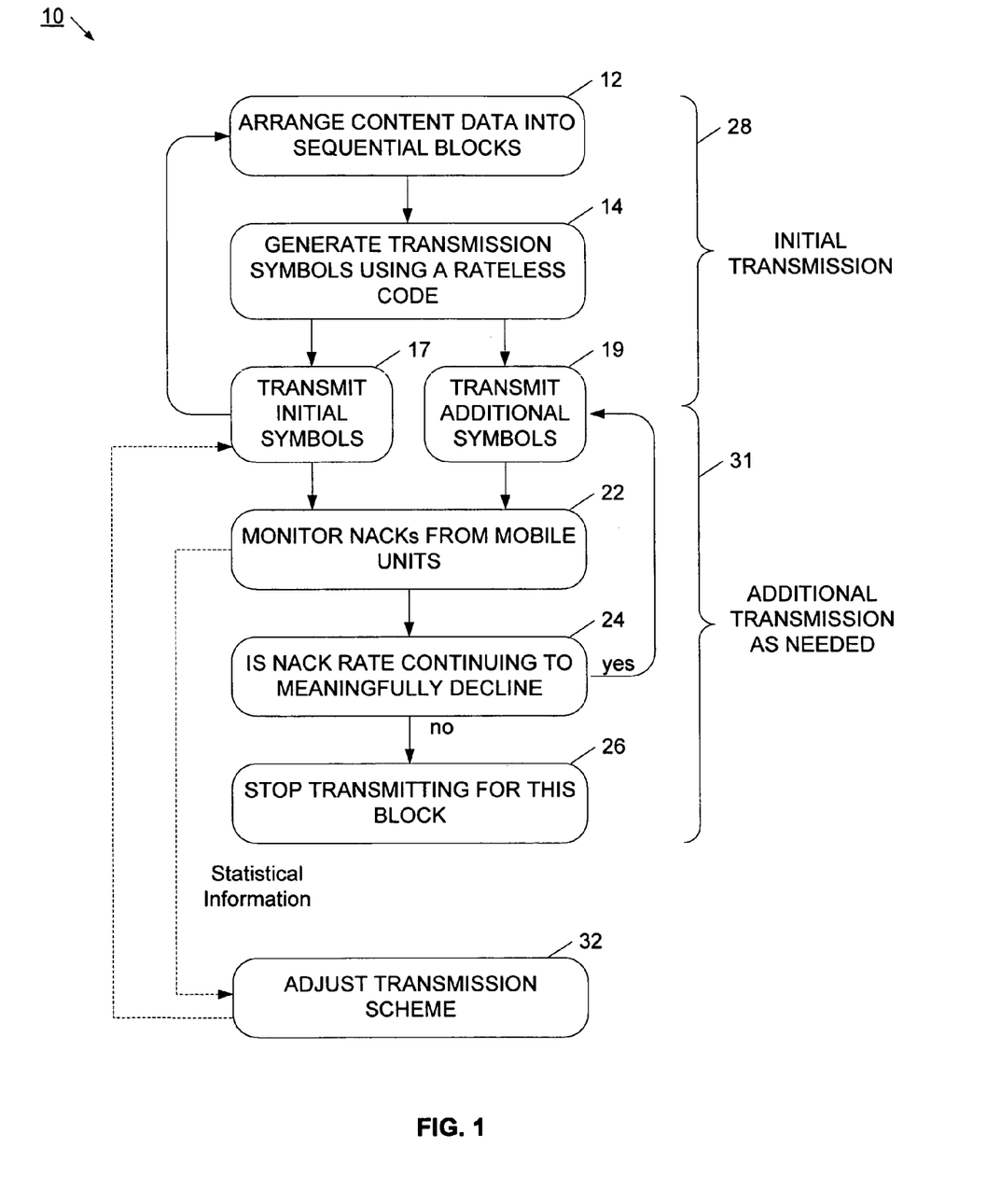
FIG. 1 is a flowchart of a method for broadcasting data using a wireless network in accordance with an embodiment of the present invention.

Referring now to FIG. 1, a method for broadcasting data using a wireless network is illustrated. Method 10 may operate on the infrastructure side of a wireless network. In one example, the wireless network may be a network compliant with one of the international communication standards such as Code Division Multiple Access 2000 ("CDMA2000", Universal Mobile Telecommunications System ("UMTS", Enhanced Data Rates for GSM Evolution ("EDGE"), Personal Handy-phone System ("PHS", Global System for Mobile communications ("GSM", or other communication standard. In another example, the wireless network may be a proprietary commercial, governmental, or military network. The wireless network infrastructure cooperates with a set of wireless remote devices. These remote devices may be, for example, wireless handsets, mobile phones, mobile personal data assistants, wireless notebook computers, wireless laptop computers, or wireless mobile modules. A wireless mobile module is a wireless modem that is incorporated into another device, such as a vehicle, for providing wireless communication.

Often, it is desirable that the network transmit the same data to a number of the wireless remote devices. For example, it may be desirable to broadcast a live sporting event to a large number of mobile phone users. In this way, each wireless phone receives the same video and data information. In another example, the wireless network may desire to send the same audio or image data to a set of users, or a system may be configured to broadcast emergency information to a large number of remote and wireless users. In each of these examples, it is desirable to efficiently transfer the data to all target users, while limiting strain on network resources. In particular, many wireless networks are sensitive to the traffic or information sent on the reverse link, which is the communication link from the remote users back to the infrastructure or base station. Accordingly, it will be desirable that a network system operate in a broadcast mode that substantially reduces the amount of reverse network traffic as compared to known one-to-one communication processes. Further, it is desired that the broadcast system be able to adapt to a changing communication environment to allow for a more efficient use of network resources. Accordingly, broadcast system 10 provides a statistical feedback system that enables the network to adjust transmission schemes in response to actual or changing communication conditions.

In method 10, a content data file is arranged into a series of sequential data blocks as shown in block 12. The content data may be, for example, a video file, a video stream, an audio file, an image, or another data file. Each block is coded according to a rateless code process. A rateless code process is a particular encoding scheme that generates transmission symbols that allow a decoding device to recover the original data file upon receiving a sufficient number of rateless transmission symbols, as shown in block 14. Importantly, the decoder can recover the original file upon receiving any subset of the generated codes, providing a sufficient number of symbols are received. In this way, the decoding device does not have to request that a missed set of symbols be resent, but can merely wait for additional new symbols to be sent. Then, upon having received a sufficient number of transmission symbols, the decoding device may recover the original data file. By using a rateless code process, the heavy burden of resending data packets may be avoided.

Several specific variations of rateless codes may be used in method 10. For example, a common rateless code is referred to as "Tornado" coding. Tornado coding is described in U.S. Pat. No. 6,411,223, issued Jun. 25, 2005. Another common rateless code is referred to as "Raptor" coding, and is described in U.S. Patent Publication 2005/0010847, published Jan. 13, 2005. The use of rateless coding is further described in copending U.S. patent application Ser. No. 11/263,893, filed Oct. 31, 2005, and entitled "Wireless Communication Coding and Transmission Systems and Methods"; and U.S. patent application Ser. No. 11/125,517, filed May 9, 2005, and entitled "Multiple Source Wireless Communication System and Method"; both of which are incorporated herein by reference. It will be understood that other variations and specific versions of the rateless code may be used in method 10.

In method 10, the rateless coding process is applied to each data file to generate a set of initial transmission symbols as shown in block 17. The number of initial symbols may be set according to the desired transmission coverage or transmission integrity. For example, the initial set of symbols may include enough transmission symbols so that about 95% of the mobile users will be able to decode the data blocks from the initial symbols only. In other examples, the number of initial symbols transmitted may be adjusted to accommodate stricter or more relaxed requirements. Further, the number of initial symbols per data block may be adapted dynamically according to transmission quality and feedback received from the mobile devices.

The initial set of transmission symbols is transmitted or broadcast to all the mobile units. After a short delay, mobile units that did not receive a sufficient number of symbols respond with a NACK message. It will be appreciated that the network may start monitoring for these NACKs at any time, but will typically wait until after all initial symbols have been sent. In this way, mobile devices having received sufficient numbers of transmission symbols make no response, so therefore reverse link traffic is limited only to those mobile devices that failed to receive a sufficient number of transmission symbols in a first transmission time period. The NACK's response rate is monitored as shown in block 22. In this way, the number of NACKs per unit time is monitored, and is used to determine when additional transmission symbols should be broadcast. For example, once the NACK rate has reached a threshold point or increases at a certain rate, method 10 transmits additional transmission symbols as shown in block 19. These additional transmission symbols may be sent to all the mobile devices, or they may be sent to the subset responding with a NACK message. After the additional transmission symbols have been broadcast, the NACK rate is continued to be monitored as shown in block 24. More particularly, the NACK rate is compared to a previous NACK rate, and evaluated to see if the NACK rate is declining in a meaningful way.

If the NACK rate is continuing to meaningfully decline, then method 10 is aware that the broadcast of additional transmission symbols is efficiently enabling additional wireless devices to decode the data block. Accordingly, additional symbols may continue to be broadcast as shown in block 19. Method 10 continues to send additional transmission symbols and monitor the NACK rate until the NACK rate stops declining, or reaches a constant or near constant level. Upon reaching this NACK condition, method 10 becomes aware that the further broadcast of additional transmission symbols results in only limited improvement in decoding coverage. Alternatively, the transmission of the additional symbols may be stopped when so much time has elapsed that a data block can no longer be meaningfully decoded, or when the absolute NACK rate indicates that all or nearly all wireless mobile devices have successfully decoded the data block. In these cases, the transmission of additional symbols is stopped as shown in block 26.

Generally, then, method 10 as initial transmission portion 28 which takes sequential data blocks, converts each data block into sets of rateless transmission symbols, and transmits those initial symbols in a broadcast manner to the wireless devices. This process may be sequentially repeated for all the available blocks, and may continue irrespective of the transmission of additional symbols. Method 10 also has additional transmission portion 31 which supplements the number of symbols transmitted in the initial symbol set. The additional transmission portion 31 is adaptive to current transmission quality, and therefore may have different numbers of transmission symbols sent for different data blocks. For example, one block may be sent during a time when the vast majority of wireless mobile devices are in a high-quality transmission status, and therefore only a few or even no additional symbols need to be sent. At a later time, another data block may be transmitted where many of the mobile devices are in a relatively poor transmission quality status, and therefore many sets of additional symbols may have to be sent.

It will also be appreciated that the number of symbols in the initial symbol set may be adjusted according to communication quality. For example, if transmitting a particular number of initial symbols causes a very large NACK rate, the process may be adjusted to include more symbols in the initial symbol set. In a similar example, if the transmission of the initial set results in an extremely low NACK rate, then the number of symbols in the initial set may be reduced to try to reduce network traffic. Also, the number of additional symbols sent responsive to a declining NACK rate may be adjusted. More particularly, if a particular number of additional transmission symbols has only a limited effect on NACK rate, the number of transmission symbols in the next set may be increased in an attempt to mores efficiently provide a sufficient number of additional symbols to the wireless devices.

Method 10 collects information regarding NACKs and NACK rate, which provides useful statistical information regarding the performance of the forward broadcast link. This statistical information may be used to make adjustments in the transmission scheme for future transmissions as shown in block 32. These changes may include adjustments in modulation, power, or other channel setting. Also, the statistical information may be used by the network to determine that some users should be switched from a broadcast mode to a unicast mode, where the mobile unit provides acknowledgment feedback for received packets. Conversely, the statistical information may be used to switch some users from a unicast mode back to a broadcast mode to reduce reverse link traffic. More generally, the NACK statistical information may be useful in allocating network resources between broadcast mode and unicast mode. It will also be appreciated that the NACK statistical information may be combined with other available information, such as ACK feedback for unicast transmissions, to further adjust the transmission scheme.

Finally, method 10 may also receive additional network or communication channel information useful for adjusting method parameters. For example, the mobile devices may return signal-to-noise ratio or other transmission quality information along with their NACK response. This quality information may be used to adjust the encoding processes, or may be used by the transmission infrastructure to change or adjust transmission parameters. Transmission parameters, which may include power, modulation-order, spatial-transmission, and channel considerations, may be adjusted for individual mobile devices, or may be adjusted for the entire set of broadcast devices.

Figure 2:
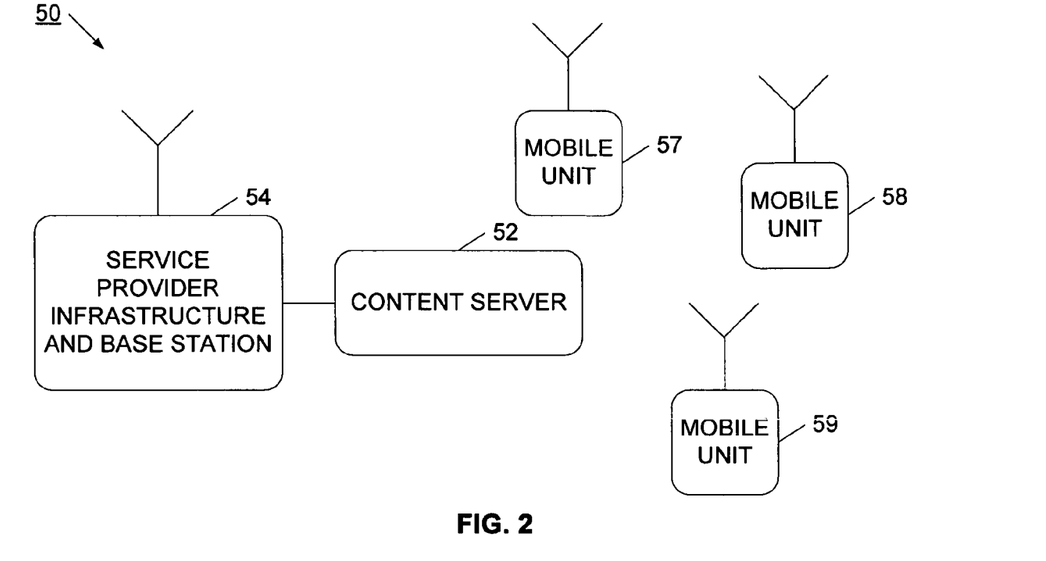
FIG. 2 is a block diagram of a system for broadcasting data using a wireless network in accordance with an embodiment of the present invention.

Referring now to FIG. 2, a system for broadcasting data using a wireless network is illustrated. System 50 includes content server 52 having content data for broadcast. This content may be for example, a video stream, a video file, an audio file, or other data. Base station or other infrastructure system 54 receives the content on content server 52. Base station 54 arranges the content data into a series of data blocks, and encodes those data blocks according to a rateless code process. Each of the data blocks is then sequentially broadcast to mobile units such as mobile units 57, 58, and 59. For each data block, base station 54 transmits an initial set of transmission symbols to all mobile units 57, 58, and 59. Upon receiving a data packet for a data block, a mobile unit opens up a time window, and receives transmission symbols during that time period. At the conclusion of the time period, the mobile unit determines if it has received sufficient transmission symbols to decode the data block. If it has not received sufficient symbols, the mobile unit responds with a NACK message to base station 54.

Depending upon NACK rates for the entire broadcast system, the base station may broadcast additional transmission symbols to one, a subset or all mobile units. Mobile units that do not have a sufficient number of symbols continue to monitor for received symbols, and continue to periodically generate NACK messages if insufficient symbols have not been received. At some time, base station 54 will terminate the sending of additional symbols due to a monitored NACK rate, or because time has passed for any useful decoding of the data block. For example, in a video stream each data block must be encoded in a particular limited amount of time, or the video information can not be presented to the user. Therefore, if the time period has passed, then it is no longer useful to send additional transmission symbols unless buffering is done at the mobile.

Figure 3:
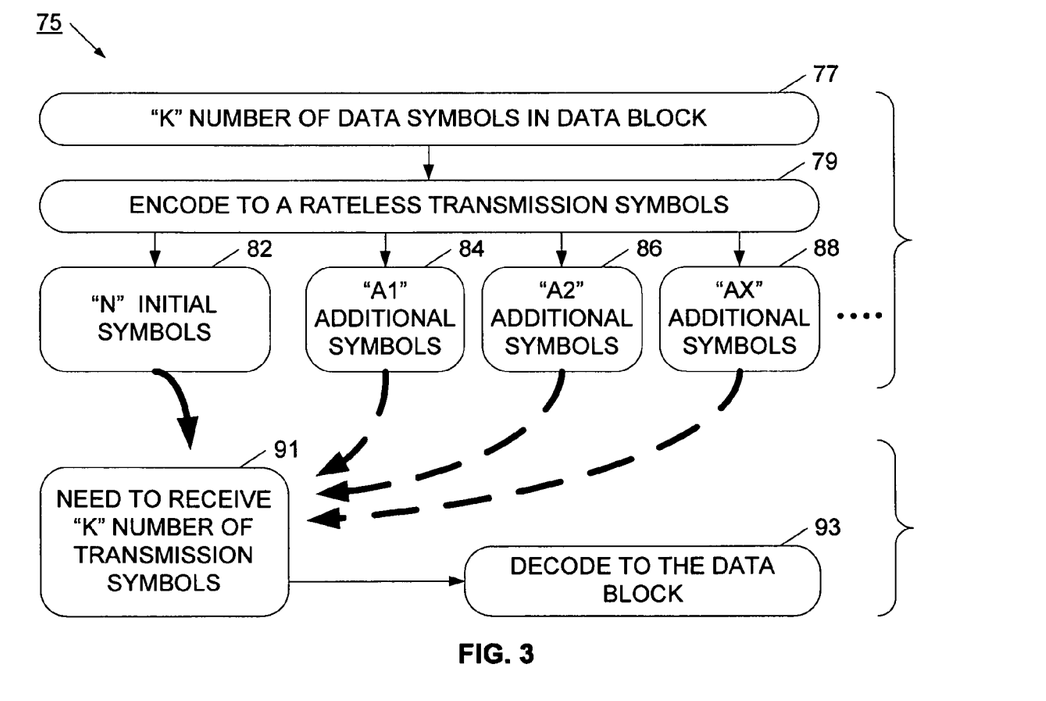
FIG. 3 is a flow diagram of a method for broadcasting data using a wireless network in accordance with an embodiment of the present invention.

Referring now to FIG. 3, a method for broadcasting data using a wireless network is illustrated. Method 75 has a data block which is represented by K number of data symbols as shown in block 77. These K number of data symbols may be encoded using a rateless encoding scheme into rateless transmission symbols as shown in block 79. A set of initial symbols is sized to have N symbols as shown in block 82. The value of N is set so that a threshold number of wireless devices is likely to be able to decode the data block using only the initial symbols. More particularly, the receiver needs to receive K number of transmission symbols in order to recover the data block, as indicated in block 91. In this way, N is set sufficiently larger than K so that expected symbol losses will still allow a particular number of wireless devices to receive K transmission symbols. For example, if a data block has 1000 data symbols, an initial set of symbols may be set at 1010. In this way, up to 10 symbols may be lost or otherwise not received by each wireless device, and each wireless device would still be able to decode or recover the data block. The number 1010 will be selected according to expected transmission quality, as well as monitored NACK rates and information received from the mobile devices.

Typically, the value of N will be selected such that about 90% to 95% of all mobile devices are able to recover the data block using only the initial transmission symbols. However, some of the mobile stations receiving a broadcast data wiii not receive K number of transmission symbols, but will receive a number smaller than K. Accordingly, these mobile devices will not be able to recover the data block. These mobile devices respond to the network with a NACK, and depending upon NACK rates in the overall system, the network may respond with additional symbols as shown in block 84. A quantity A1 additional symbols may be broadcast again, in order to supplement the number of symbols received by the responding mobile devices. The value of A1 may be set according to transmission quality or otherwise adapted to current conditions. Periodically, the mobile devices will evaluate whether they have sufficient number of transmission symbols, and continue to generate NACK messages until K number of symbols have been received. Accordingly, additional numbers of symbols as shown in blocks 86 and 88 may be transmitted. The process of sending additional symbols and generating NACK messages may continue until the network terminates the process due to lapsed time or NACK rate considerations. Those mobile devices having received at least a K number transmission symbols are then able to decode the data block as shown in block 93.

Figure 4:
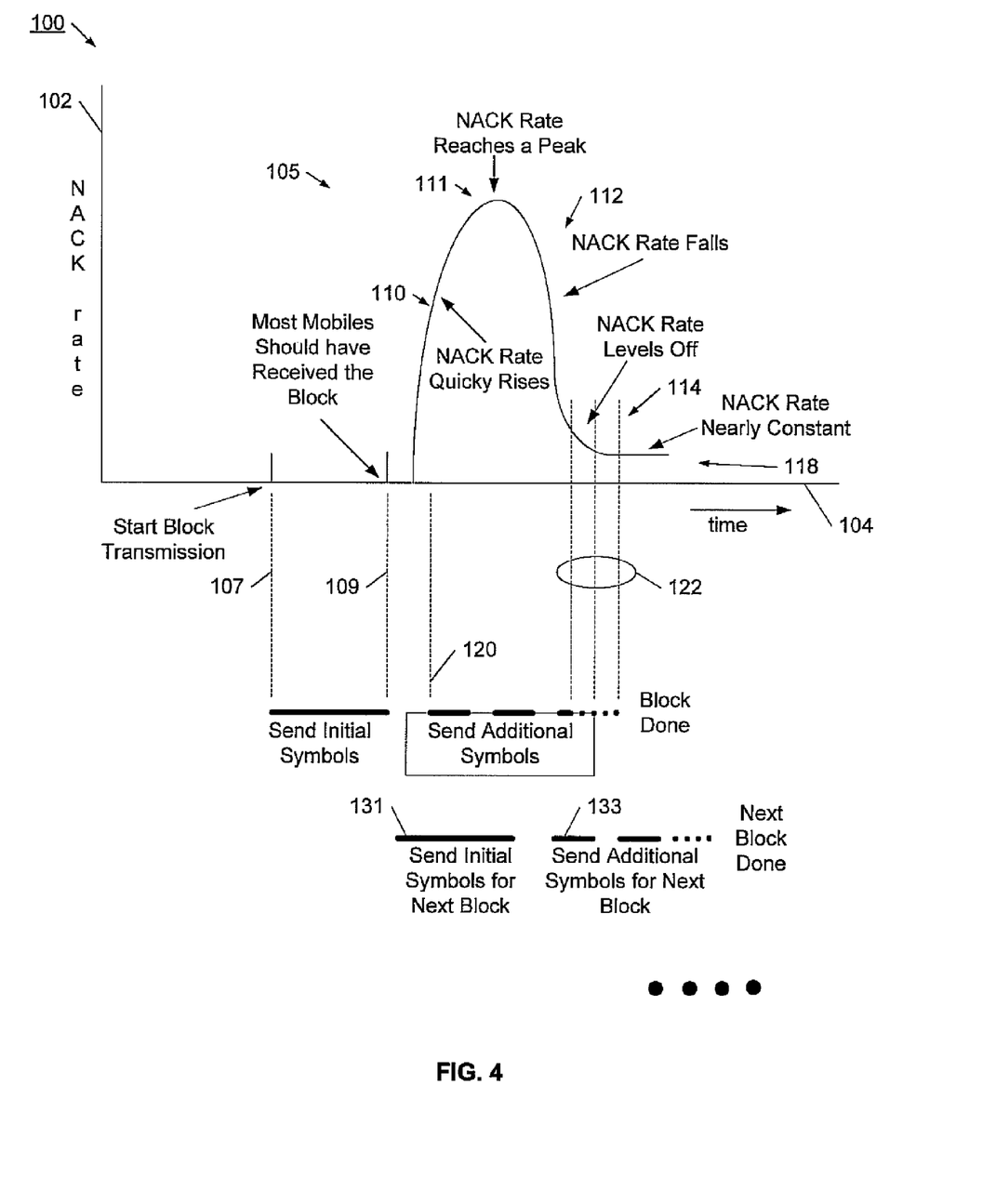
FIG. 4 is a graph of NACK rate response for broadcasting data using a wireless network in accordance with an embodiment of the present invention.

Referring now to FIG. 4, a method for broadcasting data using a wireless network is illustrated. Method 100 is graphically illustrated according to a monitored NACK rate in a broadcast wireless system. Graph 105 has time along its x-axis 104 and a NACK rate along the y-axis 102. At a time 107 the network sends an initial set of transmission symbols, with the transmission symbols having been encoded using a rateless code process. The network takes a period of time to send the initial symbols, and completes sending the set of initial symbols at time 109. The number of initial symbols has been selected such that most mobiles should be able to decode or reconstruct the data block with the symbols received during the initial send period. Those mobile devices that received some, but not enough, transmission symbols will then generate NACK responses indicating that they need additional symbols. It is likely that most of the mobile stations will respond with their NACK messages at about the same time, so the NACK rate monitored by the network will rise very quickly as shown by line 110.

The NACK rate will rise quickly to reach a peak as shown at point 111. Once the network is aware that a threshold rate of NACKs exists, the network moves to send additional symbols. As shown in graph 105, at time 120 the network begins to send an additional set of transmission symbol. As additional symbol sets are transmitted, the NACK rate begins to fall as shown in block 112. Typically, the NACK rate will fall at an appreciable or meaningful rate and then begin leveling off as shown at transition 114. The transition area 114 shows that the sending of additional transmission symbols is resulting in only a relatively few additional mobile devices receiving the needed number of symbols. Accordingly, as the NACK level rate levels off and becomes nearly constant as shown as shown at point 118, the network determines that it is no longer efficient or effective to continue sending additional symbol sets. At a time 122, the network therefore terminates sending any additional symbol blocks for the first data block. It will be appreciated that the particular time point 122 may be set according to application requirements. It will be understood that the transmission of these additional symbols could be in a different transmission scheme. For example, the transmission scheme could be adjusted for modulation-order, power, spatial-channel, carrier, or other channel considerations. In some cases, the additional symbols may be sent to specific mobile units using a unicast mode.

In some cases, the termination may wait until a constant or nearly constant NACK rate is seen as shown at area 118. In other cases, the network may terminate sending additional symbols when no meaningful decline in NACK rate is found. A meaningful NACK rate decline means that an insignificant additional number of mobile users are able to reach the decoding threshold by the sending of additional symbols. It will be understood that the meaning of meaningful decline may be different according to different types of data, and for different classifications of users. For example, some image data may be relatively insensitive to lost data blocks, whereas some audio files may be highly sensitive to lost data. It will also be understood that some data blocks are time sensitive, so that after a window of usefulness has passed, it also makes no sense to continue sending additional symbol sets. For example, a video stream has data blocks which must be decoded and presented in sequential order. Once the practical time has passed for displaying a data block, it no longer is useful to send additional transmission symbols for that data block.

The description with reference to FIG. 4 has so far discussed the sending of only one data block. Of course, data typically is arranged into many data blocks, and the data blocks are typically encoded and transmitted in sequential order. Accordingly, a next symbol block may be sent shortly after the initial symbols have been sent as shown by line 131. The sending of the next block may be concurrent or coordinated with the sending of additional blocks for one or more previous data blocks. In a similar way, the sending of the additional blocks for the next blocks as shown by line 133, may be done concurrently or coordinated with the sending of blocks symbols from different blocks. In this way, the receiving devices may be receiving an initial symbol set for a particular data block, while still receiving additional symbols for partially received previous blocks.

Figure 5:
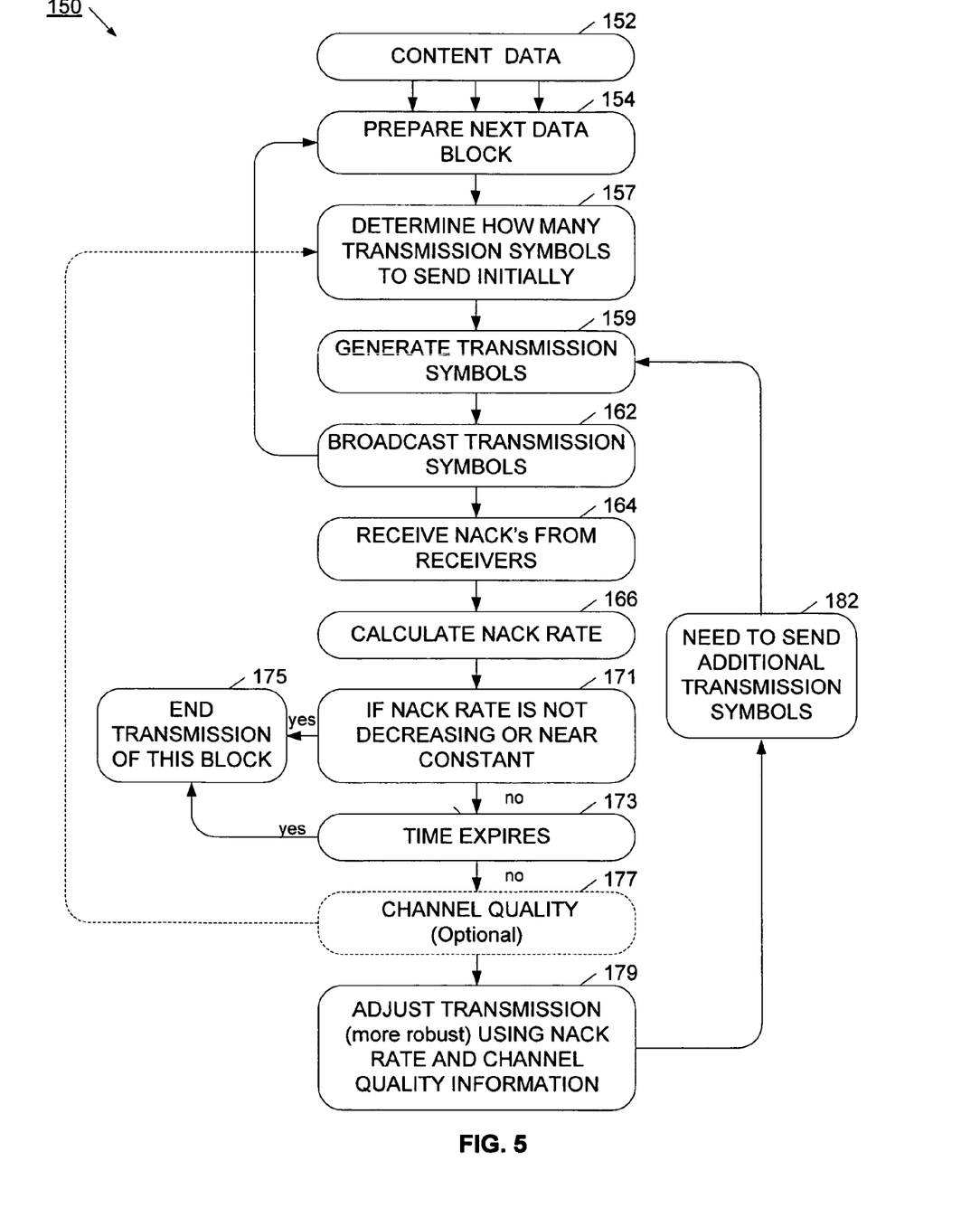
FIG. 5 is a flowchart of a method for broadcasting data using a wireless network in accordance with an embodiment of the present invention.

Referring now to FIG. 5, a method for broadcasting data using a wireless network is illustrated. Method 150 has content data provided by a content server as shown in block 152. The content data may be, for example, video data, video stream, audio, image, or other data. The data is arranged into sequential blocks as shown in block 154. The system determines how many transmission symbols are to be used in the initial set of transition symbols as shown in block 157. This number may be set according to application requirements, or may be adapted to current communication conditions. The data blocks are then encoded according to a rateless coding process as shown in block 159. The symbols are then broadcast to a number of mobile devices as shown in block 162. The process of preparing the next data block, generating transmission symbols, and broadcasting in next data block continues sequentially as indicated. For many systems, the number of symbols in the initial set of symbols will be sufficient to allow the vast majority of the mobile devices to decode and reconstruct the data blocks. However, some of the data blocks for some of the mobile devices may not have been properly received. For these cases, method 150 allows for the broadcasting of additional transmission symbols.

For each data block, method 150 monitors the NACK messages received from the mobile devices as shown in block 164. A NACK rate is calculated as shown in 166, and the NACK rate is used to determine whether additional transmission symbols or broadcast for that data block as shown in block 171. For example, if the NACK rate is not decreasing or is near a constant value, then transmission of that block is ended as shown in block 175. However, if meaningful decline in NACK rate is still being seen responsive to sending additional transmission symbols, then method 150 inquires as to whether time has expired for transmitting this block as shown in block 173. For example, some types of data are sensitive to time, and once a particular time period has passed, it is no longer useful to decode the data block. If time has expired, then transmission of this block ends as shown in block 175.

Optionally, the network may also extract channel quality information from messages received from the mobile devices as shown in block 177. For example, mobile devices may include signal-to-noise ratio or other quality information along with their NACK response. If this channel quality information has been extracted, then this channel quality information may be used to adjust the transmission as shown in block 179. The transmission adjustment may include power adjustment or other modulation or channel adaptation. Even if channel quality information is not extracted, the current NACK rate may be used to also adjust transmission.

Method 150 may determined that the sending of additional symbols is still seeing a meaningful decline in NACK rate, and that the transmission symbols could still be usefully received by the receiver, and therefore may send additional transmission symbols as shown in block 182. Accordingly, additional generated transmission symbols for that block are then broadcast as shown in blocks 159 and 162. Again, the receiving device continues to monitor its received symbols, and provides a NACK message if sufficient symbols have not been received. The mobile device may evaluate its ability to decode a data set on a periodic basis, or the evaluation may be done responsive to some other time frame. Either way, the mobile device will continually monitor received transmission symbols, and respond with a generated NACK message until a transmission window has closed, or sufficient symbols have been received. It will be appreciated that the transmission window of time period may be set according to the particular type of data received, and requirements for overall system performance.

Figure 6:
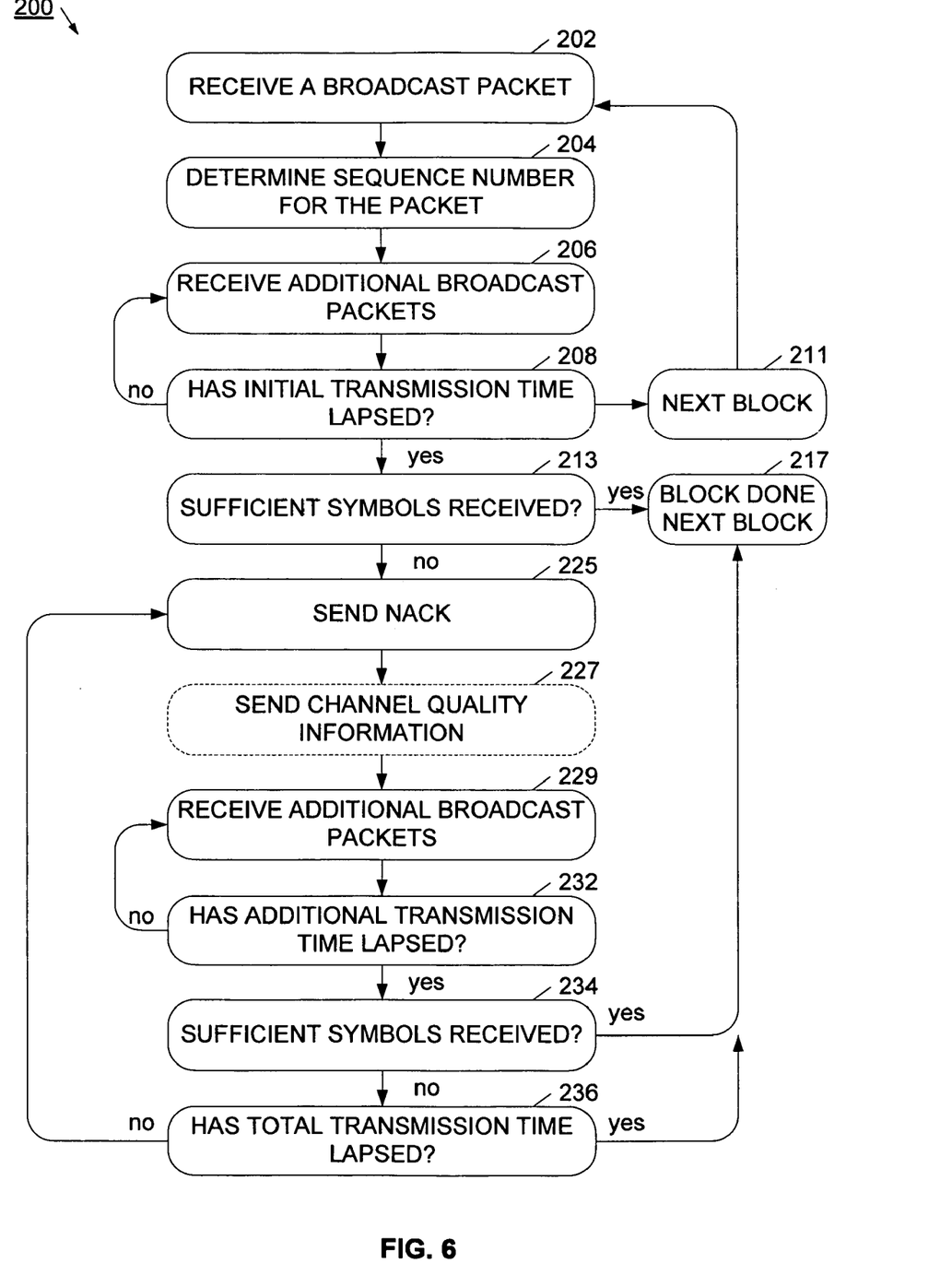
FIG. 6 is a flowchart of a method operating on a mobile device for receiving broadcast data in accordance with an embodiment of the present invention.

Referring now to FIG. 6, a method for receiving broadcast data is illustrated. Method 200 may be operated on, for example, a wireless mobile phone operating in a network environment. The wireless device is configured to operate in a broadcast mode, and therefore cooperates in reducing reverse link communication traffic. The wireless device receives a broadcast packet as shown in block 202. The mobile device determines the sequence number of the packet as shown in block 204, or otherwise determines the start time for a transmission time window. In a simple example, the wireless mobile device may start a transition window of a predetermined length upon receiving a broadcast packet. In a more complex example, the mobile device could determine if its received packet was the first packet of a data block, and if not, adjust the time window accordingly. During the time the broadcast time window is open, the mobile device continues to receive additional broadcast packets as shown in block 206. At some point, the transmission time will lapse as shown in block 208. Since this initial time period is set such that the vast majority of mobile devices are expected to have received sufficient symbols, the mobile device may then move on to start receiving the next block as shown in block 211. In this way, the mobile device may begin receiving symbols indicative of the next block.

After the initial time period has ended, the wireless device evaluates the transmission symbols received for the first block as shown in block 213. If sufficient symbols have been received to decode or recover the data block, then the data block is decoded and recovered and no further action is required for this block as shown in block 217. However, if sufficient symbols have not been received, then the mobile device generates a NACK message and sends that NACK message back to the base station as shown in block 225. Optionally, the NACK message may include channel quality information, such as signal to noise ratio, as shown in block 227. The mobile device then opens an additional transmission time window in which it waits for additional transmission symbols.

The sending of transmission symbols is dependent on network NACK rates, and so the mobile device may or may not receive additional packets. During the additional time window, the mobile device receives additional broadcast packets as shown in block 229, provided such packets have been sent. After this additional transmission time has lapsed as shown in block 232, the mobile device again evaluates whether sufficient number of symbols have been received as shown in block 234. If sufficient symbols have been received, then the data block is decoded or recovered and no further activity is required for this block as shown in block 217. If sufficient symbols still have not been received, then the wireless mobile device will evaluate whether the total transmission time has lapsed as shown in block 236. Provided time still exists within the transmission time window, then the mobile wireless device again sends a NACK message, and continues to wait for additional packets. In this way, the wireless mobile device continues to supplement its set of received symbols until either it has received a sufficient number of symbols, or total time has lapsed.

While particular preferred and alternative embodiments of the present intention have been disclosed, it will be apparent to one of ordinary skill in the art that many various modifications and extensions of the above described technology may be implemented using the teaching of this invention described herein. All such modifications and extensions are intended to be included within the true spirit and scope of the invention as discussed in the appended claims.

What is claimed is:

1. A method for broadcasting data to a plurality of mobile devices using a wireless network, comprising:

arranging the data into a plurality of data blocks;

broadcasting an initial set of rateless transmission symbols indicative of a first one of the data blocks;

determining a no-acknowledgment ("NACK") rate for NACK responses received from mobile devices that did not receive sufficient initial symbols;

evaluating the NACK rate to determine when additional transmission symbols are to be broadcast;

transmitting, responsive to evaluating the NACK rate, additional rateless transmission symbols indicative of the first data block; and terminating, responsive to evaluating the NACK rate, transmission of additional symbols for the first data block.

2. The method according to claim 1, wherein the additional rateless transmission symbols are transmitted when the NACK rate is evaluated to be meaningfully declining.

3. The method according to clam 1, wherein the transmission of additional rateless transmission symbols is terminated when time for transmitting the first block has expired.

4. The method according to claim 1, wherein the transmission of additional rateless transmission symbols is terminated when the NACK rats is evaluated to be needy constant.

5. The method according to claim 1, wherein the transmission of additional rateless transmission symbols is terminated when the NACK rate has passed its peak and is evaluated to be not declining.

6. The method according to claim 1, further including the step of using the NACK rats to adjust transmission parameters for transmitting the additional symbols.

7. The method according to claim 1 further including the step of using the NACK rate to adjust transmission parameters for transmitting an initial set of rateless transmission symbols indicative of a second one of the data blocks.

8. The method according to claim 1, further including the steps of:

extracting transmission quality information from the NACK responses; and using the extracted transmission quality information to adjust transmission parameters for transmitting the additional symbols.

9. The method according to claim 1, further including the steps of:

extracting transmission quality information from the NACK responses; and using the extracted transmission quality information to adjust transmission parameters for transmitting an initial set of rateless transmission symbols indicative of a second one of the data blocks.

10. The method according to claim 1, further including the step of using the NACK rate to determine how many transmission symbols to broadcast in an initial set of rateless transmission symbols for a second one of the data blocks.

11. The method according to claim 1, further including the step of using the NACK rate to adjust the transmission scheme for broadcasting a next initial set of rateless transmission symbols.

12. The method according to claim 1, further including the step of using the NACK rate to switch some of the mobile devices to a unicast mode, so that the switched mobile devices use a unicast mode to receive a next initial set of rateless transmission symbols.

13. The method according to claim 1, further including the step of using the NACK rate to allocate network resources between broadcast mode and unicast mode.

14. A method for broadcasting data to a plurality of mobile devices using a wireless network, comprising:

arranging the data into a plurality of data blocks;

determining a number of rateless transmission symbols to initially broadcast for each data block;

broadcasting an initial set of rateless transmission symbols for each one of the data blocks;

monitoring a no-acknowledgment ("NACK") rate for each respective data block; and transmitting additional rateless transmission symbols for each respective data block according to the monitored NACK rate.

15. The method according to claim 14, wherein the step of transmitting additional rateless transmission symbols for each respective data block is done according to the following conditions:

when the respective NACK rate is nearly constant or constant, terminating transmission of additional transmission symbols for that respective data block;

when the respective NACK rate continues to meaningfully decline, continuing to transmit additional transmission symbols for that respective data block;

when the respective NACK rate is below a predetermined threshold, terminating transmission of additional transmission symbols for that respective data block; and when time has expired to transmit the respective data block, terminating transmission of additional transmission symbols for that respective data block.

16. The method according to claim 14, further including the step of monitoring the NACK rate for a peak NACK rate, and terminating the transmission of additional transmission symbols at a time after the peak.

17. The method according to claim 14, further including the step of adjusting the number of rateless transmission symbols to initially broadcast according to the monitored NACK rate.

18. The method according to claim 14, further including the step of using the monitored NACK rate to adjust transmission parameters for transmitting the additional symbols.

19. The method according to claim 14, further including the step of receiving transmission quality information along with NACK responses, and using the transmission quality information to adjust transmission parameters for transmitting the additional symbols.

20. The method according to claim 14, further including the step of receiving transmission quality information along with NACK responses, and using the transmission quality information to adjust the number of rateless transmission symbols to initially broadcast according to the monitored NACK rate.

21. The method according to claim 14, further including the step of using the NACK rate to adjust the transmission scheme for broadcasting a next initial set of rateless transmission symbols.

22. The method according to claim 14, further including the step of using the NACK rate to switch some of the mobile devices to a unicast mode, so that the switched mobile devices use a unicast mode to receive a next initial set of rateless transmission symbols.

23. The method according to claim 14, further including the step of using the NACK rate to allocate network resources between broadcast mode and unicast mode.

\* \* \* \* \*